United States Patent
Sakai (10) Patent No.: US 7,053,762 B2
(45) Date of Patent: May 30, 2006

(54) PROJECTING DIRECTION CONTROL SYSTEM FOR VEHICLE HEADLAMP

(75) Inventor: Tomoyuki Sakai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 100 days.

(21) Appl. No.: 10/696,611

(22) Filed: Oct. 29, 2003

(65) Prior Publication Data

US 2004/0114382 A1    Jun. 17, 2004

(30) Foreign Application Priority Data

Dec. 6, 2002    (JP)    ............................ P.2002-354914

(51) Int. Cl.
*B60Q 11/00* (2006.01)
(52) U.S. Cl. ...................... 340/458; 362/460; 362/465; 362/466; 701/49; 701/70; 701/124
(58) Field of Classification Search ................ 340/458; 362/460, 465, 466, 523; 315/82; 701/49, 701/70, 124
See application file for complete search history.

(56) References Cited

U.S. PATENT DOCUMENTS 5,890,084 A * 3/1999 Halasz et al. ................. 701/45
6,193,398 B1 * 2/2001 Okuchi et al. ............... 362/466
6,374,171 B1 * 4/2002 Weiberle et al. .............. 701/71
2003/0039124 A1 * 2/2003 Tawa et al. .................. 362/464
2004/0199300 A1 * 10/2004 Gustafsson et al. ............ 701/1
2005/0033486 A1 * 2/2005 Schmitt et al. ................ 701/1

FOREIGN PATENT DOCUMENTS

| JP | 10-226271   | 8/1998 |
| JP | 2000-233682 | 8/2000 |
| JP | 2001-58539  | 3/2001 |
| JP | 2001-191842 | 7/2001 |

* cited by examiner

*Primary Examiner*—Thomas J. Mullen, Jr.
*Assistant Examiner*—Samuel Walk
(74) *Attorney, Agent, or Firm*—Fish & Richardson P.C.

(57) ABSTRACT

A projecting direction control system for a vehicle headlamp comprises a wheel-speed detecting means for detecting left and right wheel speeds and a posture decision means for calculating centrifugal force from the left and right wheel speeds obtained by the wheel-speed detecting means, difference between the wheel speeds, and characteristic information of the vehicle including vehicle width and vehicle weight so as to apprehend a rolling condition. The rolling condition can be recognized accurately from the direction and strength of the centrifugal force by calculating the centrifugal force during turning motion.

7 Claims, 5 Drawing Sheets

PROJECTING DIRECTION CONTROL SYSTEM FOR VEHICLE HEADLAMP

BACKGROUND OF THE INVENTION

The present invention relates to a projecting direction control system for a vehicle headlamp, more specially to an art for preventing a misidentifying a posture variation caused by rolling on turning of the vehicle as a pith variation.

As an instrument for controlling the projecting direction of a vehicle headlamp such that the projecting direction thereof is corrected in response to variation in the vehicle posture, there is a known instrument for automatically adjusting the projecting direction of the headlamp (a so-called auto-leveling instrument) so that the projecting direction of the headlamp is held in a predetermined state even when the inclination of the vehicle changes. When applied to a headlamp system affording a large quantity of light with a discharge lamp as a light source, such an instrument is effective in improving safety as glare is prevented from being directed onto oncoming vehicles.

For example, as disclosed in JP-A-10-226271(Japanese Application Publication Number: Hei10-226271), the height value of a front-wheel axle portion is presumed or estimated from the information obtained by one height-detecting means (height sensor) provided in the rear-wheel axle portion of a vehicle by the use of a predetermined expression, and the pitch angle of the vehicle is then obtained so as to drive the reflecting mirror of a lighting device to negate the variation of the pitch angle whereby to perform correction control in order that the angle-to-ground of an optical axis of projection light is kept at a regular angle.

Further, as disclosed in JP-A-2000-233682 (Japanese Application Publication Number:2000-233682), JP-A-2001-058539 (Japanese Application Publication Number: 2001-058539) and JP-A-2001-191842 (Japanese Application Publication Number:2001-191842), with respect to the driving condition of the vehicle, it is needed to distinguish between turning or slalom driving and stable driving at a constant speed that are different from each other.

However, in the conventional projecting direction control systems, it is feared that inappropriate projecting direction control may be performed in case that posture variation at the time of rolling due to the turning of a vehicle is misidentified as pitch variation.

For example, in the structuring (so-called one sensor system) of estimating the vehicle posture using the information obtained by one height detecting means (height sensor), the accurate driving posture of the vehicle cannot be captured when the output of the height sensor produced by rolling during turning motion is decided to be an output indicating the pitch variation, so that the correction of an optical axis of projection light cannot be made accurately as the behavior of the system becomes unstabilized. In other words, centrifugal force has to be taken into consideration when the turning motion of the vehicle is decided. Therefore, since the centrifugal force is proportional to the square of speed and inversely proportional to the slewing radius, information on the vehicle speed and the slewing radius is needed. However, the problem is that any system of detecting the slewing radius is not simple in configuration.

SUMMARY OF THE INVENTION

It is therefore a problem to be solved by the present invention to calculate centrifugal force from the information obtained on lateral wheel speeds with ease, in order to prevent vehicle posture variation caused by rolling being misidentified as pitch variation.

In accordance to the present invention, there is provided a projecting direction control system for a vehicle headlamp comprising a vehicle-posture detecting means for detecting variation in the posture in the traveling direction, a light projection control means for controlling the direction of optical axis of light projected from a vehicle headlamp in response to variation in the vehicle posture, a wheel-speed detecting means for detecting left and right wheel speeds, and a posture decision means for calculating centrifugal force from the left and right wheel speeds obtained by the wheel-speed detecting means, difference between the wheel speeds, and characteristic information of the vehicle including vehicle width and vehicle weight so as to recognize a rolling condition.

Accordingly, as centrifugal force can be calculated according to the information involved with the left and right wheel speeds and characteristic information of the vehicle including vehicle width and vehicle weight, an amount of rolling can be recognized accurately from the direction of centrifugal force acting on the vehicle while the vehicle is turning. It is thus possible to avoid misjudgment on the posture variation accompanied with rolling.

DESCRIPTION OF THE PREFERRED EMBODIMENT

The invention relates to a leveling instrument (so-called auto-leveling instrument) for performing projecting direction control that follows variation in the posture of a vehicle in a standing condition or a driving condition for the purpose of accurately recognizing a rolling condition while the vehicle is turning. Therefore, since rolling is brought about by centrifugal force during turning motion, an amount of the rolling can be converted by calculating the direction and strength of the centrifugal force, and height variation because of rolling can not be judged as pitch variation.

Figure 1:
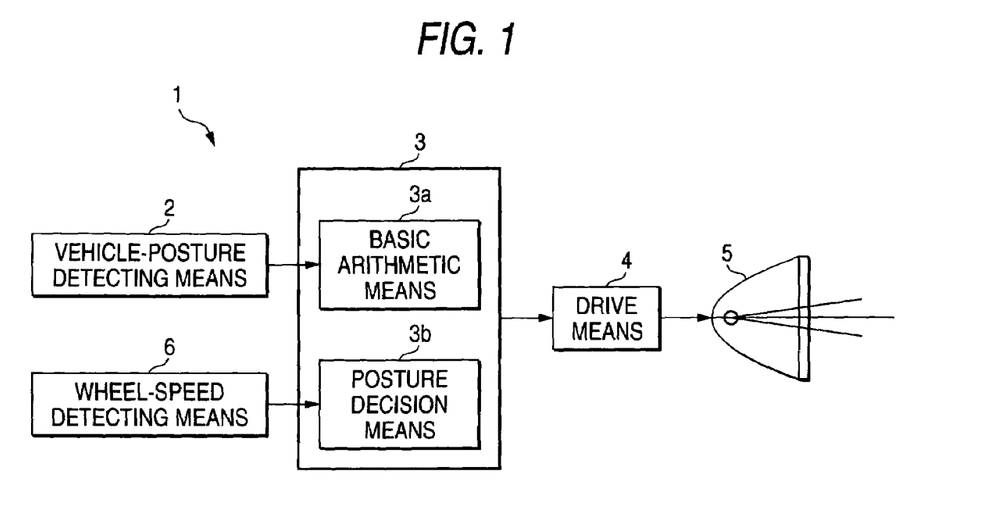
FIG. 1 is a block diagram showing a basic projecting direction control system configuration for a vehicle headlamp according to the present invention.

FIG. 1 is a block diagram showing a basic projecting direction control system configuration for a vehicle headlamp according to the invention.

A projecting direction control system 1 is comprising a vehicle-posture detecting means 2, a light projection control means 3 and a drive means 4. As the examples of the system, in an automotive lighting device, a headlamp, a fog lamp, a cornering lamp and so forth may be cited.

The vehicle-posture detecting means 2 is used for detecting a vehicle posture (including an inclination within the vertical plane in the direction of travel) at a standstill and/or in motion. In a known arrangement to detect variation in the height of a front- or a rear-wheel axle portion using a height detecting means, the rear wheel portion of the vehicle is provided with a height sensor so as to detect variation in the vehicle height involved with the rear-wheel axle portion and simultaneously to estimate variation in the height displacement of the front-wheel axle portion.

The information obtained by the height detecting means 2 is sent to the light projection control means 3 and a pitch angle indicating the vertically tilted posture in the traveling direction the vehicle is calculated, so that a control amount for use in correcting an optical axis of projection light from the headlamp 5 is calculated. In this case, the light projection control means 3 uses a computing means such as a computer and the calculations for working out the vehicle pitch angle and for controlling the optical axis of projection light are processed with software.

On receiving a signal from the light projection control means 3, the drive means 4 changes the direction of the optical axis of light projected from the headlamp 5 so as to tilt the whole lighting device or to drive optical components including a lens, a reflecting mirror, a shade and so forth. As an arrangement of performing the leveling control of the headlamp 5 by operating a mechanism for driving (or adjusting) the optical axis of projection light, using a motor and its drive circuit, for example, there is some known form of tilting a reflecting mirror on the vertical plane including the optical axis.

Figure 2:
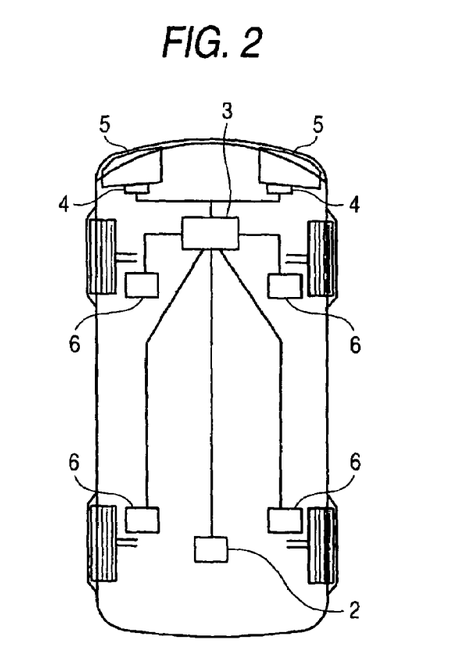
FIG. 2 is a diagram illustrating an arrangement of a height detecting means in the rear-wheel axle portion.

A wheel-speed detecting means 6 is provided to detect the speeds of the right and left wheels (see FIG. 2). In other words, the speeds of the right and left wheels are detected separately and the information thus obtained is sent to the light projection control means 3.

As described later, the centrifugal force can readily be calculated from the information obtained by the wheel-speed detecting means 6 and characteristic information of the vehicle such as vehicle width and vehicle weight.

The light projection control means 3 is provided with a basic arithmetic means 3a and a posture decision means 3b (though these means are materialized with software using a computer, both means are distinguished from each other as shown in FIG. 1 for the sake of better understanding).

The basic arithmetic means 3a is used for calculating the tilted posture of the vehicle according to the information from the vehicle-posture detecting means 2 and obtains the vehicle pitch angle according to the height information obtained and calculates the control amount for use in correcting the optical axis of projection light, for example. In other words, the basic arithmetic means 3a calculates the control amount for use in adjusting the direction of the optical axis of light projected from the headlamp 5 slightly downward when the forepart of the vehicle body is turned upward and conversely calculates the control amount for use in adjusting the direction of the optical axis of light projected from the headlamp 5 slightly upward when the forepart of the vehicle body is turned downward (the basic arithmetic means 3a having a role of calculating the basic control amount for offsetting the change of the optical axis of projection light caused by variation in the pitch angle).

The posture decision means 3b apprehends the rolling condition by calculating the centrifugal force during turning motion according to the information obtained by the wheel-speed detecting means 6.

Centrifugal force F is expressed by $F=(m \times V^2)/r$, where m=mass, r=slewing radius and V=vehicle speed.

That is, F can be calculated when V and r are known with m as a known quantity but the problem is how to obtain r.

Figure 3:
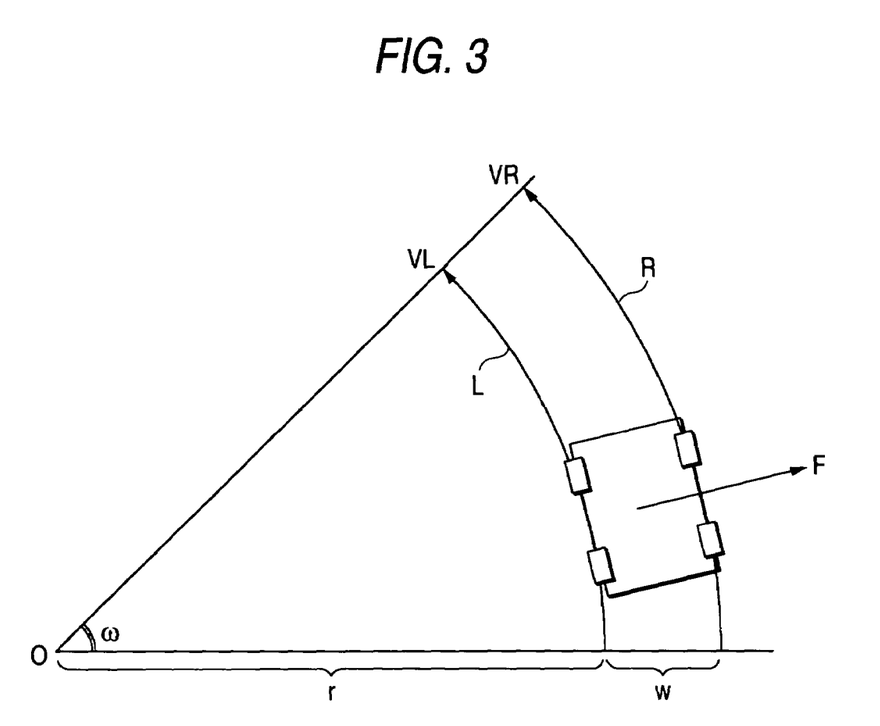
FIG. 3 is a diagram showing a situation while a vehicle is making a turn to the left.

FIG. 3 is an exemplary diagram showing a case where the vehicle makes a turn to the left and out of the arcuate arrows L and R, L represents the locus of the left wheel, whereas R represents the locus of the right wheel.

The signs shown in FIG. 3 mean the following:
ω=angular velocity around the center of turning O.
w=vehicle width (to be exact, the distance between the left and right wheels).
VL=left wheel speed (information obtained by left wheel speed sensor).
VR=right wheel speed (information obtained by right wheel speed sensor).

First, VL and VR are expressed by the following equations using r, ω and w.

$$VL = r \times \omega$$

$$VR = (r+w) \times \omega$$

Thus the following equation is formulated when difference between VR and VL is defined as ΔV.

$$\Delta V = VR - VL = (r+w) \times \omega - r \times \omega = w \times \omega$$

When ω is sought from the equation above, the following equation is obtained.

$$\omega = \Delta V/w = (VR-VL)/w$$

In the case of turning to the left, ω ranges from VL=r×ω to ω=VL/r

The centrifugal force is obtainable from $F = m \times r \times (\omega^2)$ as follows:

$$F = m \times r \times \omega \times \omega$$
$$= m \times r \times ((VL/r)) \times ((VR-VL/w)$$
$$= (m/w) \times VL \times (VR-VL)$$

In this case, the same expression may be obtained from $F = m \times VL \times VL/r = m \times VL \times \omega = m \times VL \times (VR-VL)/w$ As m and w are constants inherent in the vehicle and known constants, centrifugal force F is obtainable from the following equation with m and w as a proportional constant K.

$$F = K \times VL \times (VR-VL)$$

Thus the centrifugal force can ultimately be calculated as long as at least information on the left and right wheel speeds is available as VR−VL is made known from information on VL and VR.

In the case of turning to the right, it is only needed to reverse the left-to-right distinction in the description above (by replacing VL with VR).

The posture decision means 3b calculates the centrifugal force F from the left and right wheel speeds and the difference between their speeds, and vehicle width and vehicle weight forming characteristic information of the vehicle. In other words, the gained information involved with the left and right wheels is fed into the posture decision means 3b where VL×(VR−VL) or VR×(VL−VR) is obtained and the result is multiplied by the ratio of vehicle weight to width m/w so as to calculate centrifugal force while the vehicle is making a turn.

Although the amount of rolling produced during circular driving varies with the vehicle speed and slewing radius, centrifugal force is made easily obtainable only by knowing the difference between VL and VR, so that rolling can directly be converted into an amount of rolling.

The slewing radius and centrifugal force corresponding to the left and right wheel speeds are checked in advance and the data is formed into a map or a table before being stored into memory, whereby it is possible to find centrifugal force simply from the known constants (m and w) and the left and right wheel speeds VL and VR according to the invention as compared with calculating the centrifugal force or the amount of rolling by reference to the data when turning is detected, so that processing is simplified.

With respect to the direction of centrifugal force, the direction thereof is easily understood from the signs (VR−VL) or (VL−VR) and the strength of centrifugal force is also understood from the absolute value of (VL−VR). Thus the centrifugal force as well as the amount of rolling can be recognized from both wheel speeds and the results acquired are sent from the posture decision means 3b to the basic arithmetic means 3a and reflected on the correction of the optical axis of light projected from the headlamp 5.

The following forms may be cited, for example.

(A) A form of restricting response to projecting direction control involved with a headlamp when centrifugal force acting on a vehicle is great.

(B) A form of restricting a projecting direction control range involved with a headlamp when centrifugal force acting on a vehicle is great.

In the form (A), the information on the detected height is judged by the posture decision means 3b to be what includes much of the variation caused by rolling when centrifugal force acting on the vehicle exceeds a predetermined threshold and control response to the direction of the optical axis of light projected from the vehicle is slowed down (lowered). This is based on a way of thinking that when posture variation due to rolling is misjudged as pitch variation, it is feared that a mechanism for driving the optical axis of projection light quickly responds to the posture variation due to rolling in case that basic control of the correction of the optical axis of projection light is performed without becoming aware of the misjudgment above and in order to prevent the evil effect resulting from the correction thereof, it is better not to move the optical axis of projection light frequently.

Figure 4:
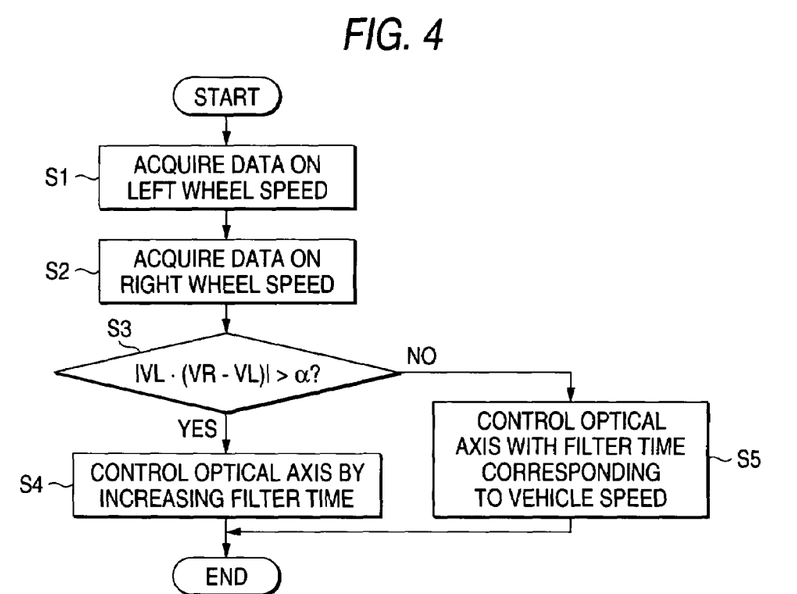
FIG. 4 is a flowchart showing an example of control when turning is detected.

FIG. 4 is a flowchart showing an example of control when turning is detected.

First, data as to left wheel speed VL is acquired at Step S1 and data as to right wheel speed VR is acquired at Step S2 (this order may be reversed).

At Step S3, an absolute value of a quantity proportional to centrifugal force VL×(VR−VL), for example, is obtained and compared with a threshold (hereinafter put down as α). In this case, the threshold α is set to each car model and differs with the comparison value of m/w.

When |VL×(VR−VL)| is greater than the threshold α, Step S4 is followed and when |VL×(VR−VL)| is equal to or smaller than the threshold α, Step S5 is followed.

At Step S4, when the control amount for use in correcting the optical axis of projection light is calculated through the filtering process of pitch angle data, too sensitive following toward pitch angle variation is suppressed by setting filter time (or detection time) longer. Incidentally, in such a form that the control amount obtainable by subjecting the data sampled within filter time to proper processing; for example, the control amount is obtained from the average value (moving average value) of an optical control amount within a predetermined time, based on which the direction of the optical axis of projection light is controlled, control response can be lowered by making the filter time longer (i.e., calculating the average value over a long period). Although the filter time differs with the car model, about 10 seconds may be set as a standard, for example.

At Step S5, the correction of the optical axis of projection light is made in accordance with the result calculated by the basic arithmetic means 3a. In the form of performing a pitch-angle data filtering process, for example, the filter time may be prescribed in proportion to the vehicle speed (as the vehicle speed grows greater, the filter time is shortened).

Figure 5:
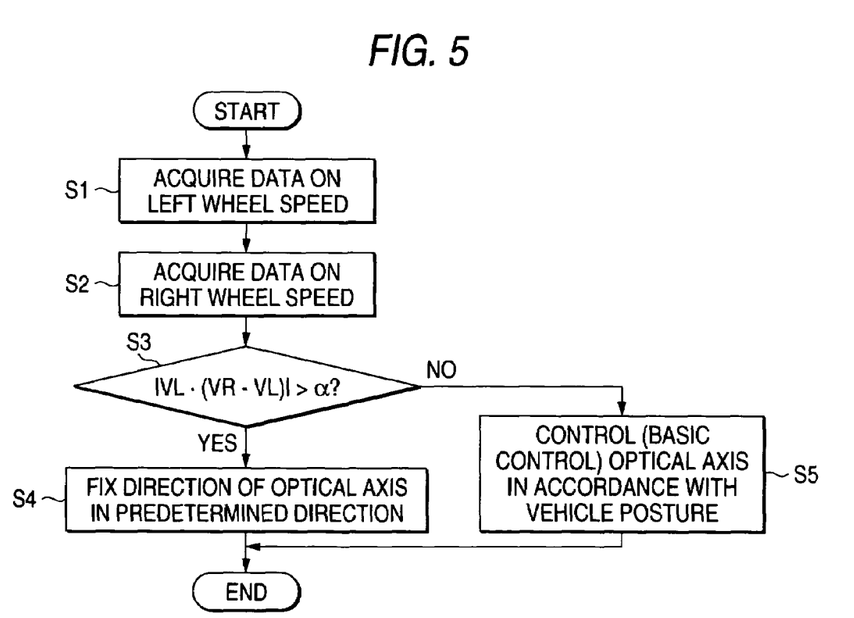
FIG. 5 is a flowchart showing another example of control when turning is detected.

In the form (B), the information on the detected height is judged by the posture decision means 3b to be what includes much of the variation caused by rolling when centrifugal force acting on the vehicle exceeds a predetermined threshold and the direction of the optical axis of light projected from the headlamp is fixed to a predetermined direction or otherwise control tolerance is reduced. This is based on away of thinking that when posture variation due to rolling is misjudged as pitch variation, it is feared that the projecting direction is directed in an unexpected direction in case that basic control of the correction of the optical axis of projection light is performed without becoming aware of the misjudgment above and in order to prevent the evil effect resulting from the correction thereof, it is better not to greatly move the optical axis of projection light.

FIG. 5 is a flowchart showing an example of control when turning is detected.

According to this embodiment of the invention, Steps S1–S3 are identical with the respective Steps S1–S3 of FIG. 4.

When |VL×(VR−VL)| is judged to be greater than the threshold α at Step S3, Step S4 is followed and the direction of the optical axis of light projected from the headlamp is fixed to a fixed direction, for example, to a direction correspond to an initial value (initial aiming value) and a control value before turning (it is desired not to move the optical axis rashly during turning motion).

When |VL×(VR−VL)| is equal to or smaller than the threshold α at Step S3, Step S5 is followed and the correction of the optical axis of projection light is made in accordance with the result calculated by the basic arithmetic means 3a. Although control is performed to keep constant the angle-to-ground of the optical axis of projection light or a forward range of visibility, the result decided by the posture decision means 3b is not reflected on the correction of the optical axis of projection light.

Figure 6:
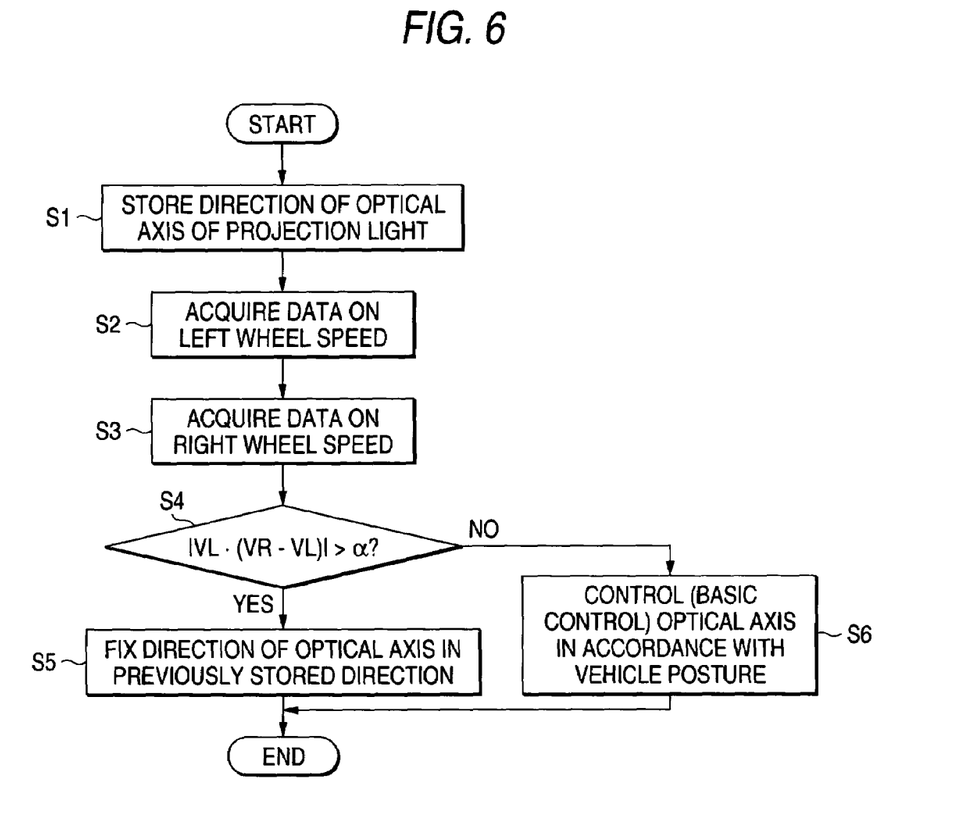
FIG. 6 is a flowchart showing still another example of control when turning is detected.

FIG. 6 is a flowchart showing another example of control when turning is detected and according to this embodiment of the invention, the direction of the optical axis of projection light during turning motion is fixed on the basis of the last control value involved with the correction of the optical axis of projection light or of the control value in the past for a fixed time.

At Step S1 first, the control amount (e.g., an amount equivalent to the position or displacement of the stroking amount of an actuator) involved with the optical axis of projection light is stored into memory, which may be done at predetermined time intervals (e.g, about five seconds) or at every driving distance or every driving time interval corresponding to the vehicle speed.

VL is acquired at Step S2 and VR is acquired at Step S3. Then Step S4 is followed at which decision is made on turning. More specifically, the absolute value of VL×(VR−

VL) is obtained and compared with the threshold α. When |VL×(VR−VL)|>α, Step S5 is followed and when |VL×(VR−VL)|≦α, Step S6 is followed.

At Step S5, the direction of the optical axis of projection light is fixed under the position control by the actuator on the basis of the control amount stored at Step S1.

Step S6 is identical with Step S5 of FIG. 5.

As described above, the contents of the projecting direction control involved with the headlamp are changed in proportion to the strength of centrifugal force during turning motion but with respect to the left and right headlamps provided in the forepart of the vehicle, there are a form of controlling the projecting directions simultaneously (synchronous control) and a form of controlling the projecting directions separately (asynchronous control).

Figure 7:
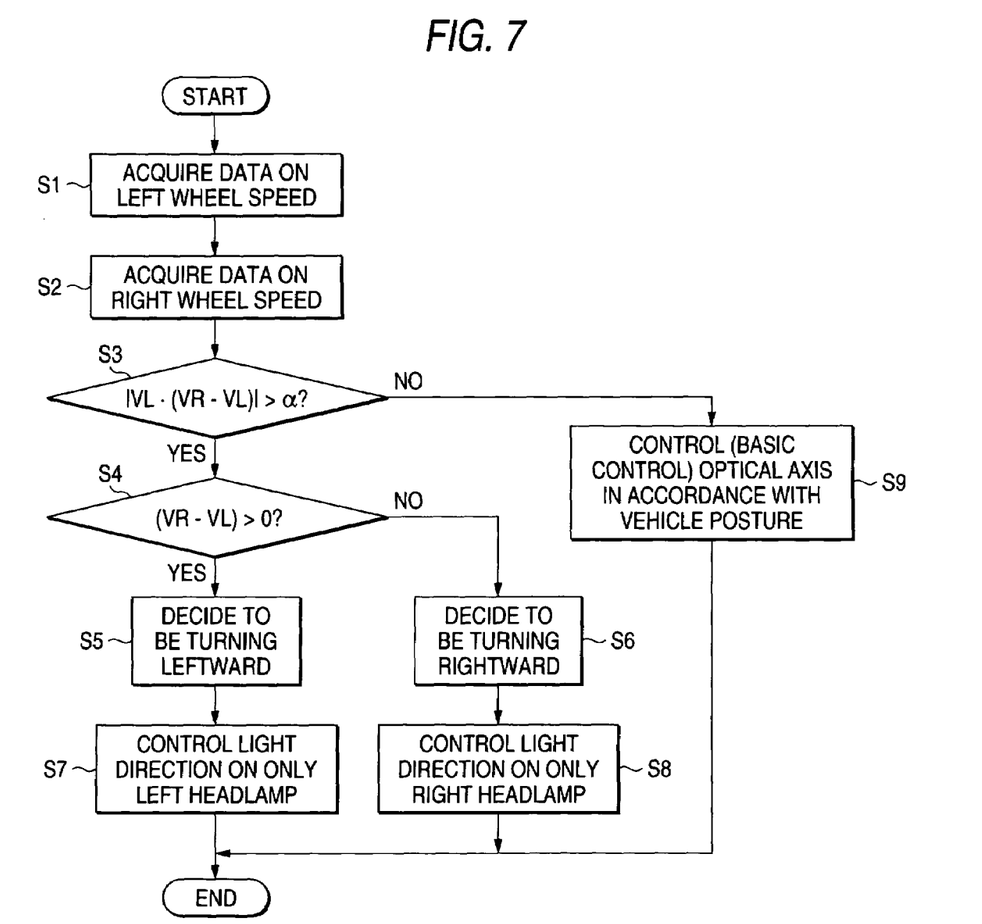
FIG. 7 is a flowchart showing an example of control when the left and right headlamps are separately controlled in accordance with the turning direction.

In the latter case, for example, when the posture decision means 3b decides the turning direction from a sign indicating the difference between the left and right wheel speeds, the direction of the optical axis of light projected from only the headlamp installed on the same side as the turning direction as seen from a direction along the traveling direction of the vehicle is controlled. In other words, the direction of the optical axis of light projected from the left headlamp (left-hand side in the traveling direction) provided in the forepart of the vehicle is controlled when the vehicle is decided to be turning to the left, whereas the direction of the optical axis of light projected from the right headlamp provided in the forepart of the vehicle is controlled when the vehicle is decided to be turning to the right.

FIG. 7 shows a flowchart showing an example of control when turning is detected as described above.

VL is acquired at Step S1 and VR is acquired at Step S2. Then Step S3 is followed at which decision is made on turning. More specifically, the absolute value of VL×(VR−VL) is obtained and compared with the threshold α. When |VL×(VR−VL)|>α, Step S4 is followed and when |VL×(VR−VL)|≦α, Step S9 is followed.

At Step S4, the turning direction is decided from the sign of VR−VL. In other words, Step S5 is followed when (VR−VL)>0 and Step S6 is followed when (VR−VL)<0.

At Step S5, the vehicle is decided to be turning to the left from VR>VL and Step S7 is followed. At Step S5, further, the vehicle is decided to be turning to the right from VR<VL and Step S8 is followed.

In consideration of the fact that one side of the vehicle body to which the vehicle makes a turn tends to float up during turning motion, the optical axis of light projected from one headlamp, out of the left and right headlamps, corresponding to the turning direction is corrected (in the following description, the left and right sides are defined as the vehicle is seen along the traveling direction of the vehicle, that is, seen from the rear of the vehicle to the front thereof).

In the case of turning to the left, for example, the direction of the optical axis of light projected from only the left headlamp is controlled at Step S7. In other words, with variation in the posture of the left portion of the vehicle, the optical axis of light projected from the headlamp is controlled so that it is not excessively tilted upward. In the case of turning to the right, further, the direction of the optical axis of light projected from only the right headlamp is controlled at Step S8. In other words, with variation in the posture of the right portion of the vehicle, the optical axis of light projected from the headlamp is controlled so that it is not excessively tilted upward.

Step S9 is identical with Step S5 of FIG. 5.

With the arrangement above, moreover, the following advantages are available.

Information on the left and right wheel speeds changing from moment to moment is acquired, whereby centrifugal force can be calculated from these pieces of information and characteristic information of the vehicle (including vehicle width and weight), and the direction of the optical axis of projection light can be performed properly in response to the rolling condition (variation in the posture due to rolling can be recognized accurately on the basis of centrifugal force).

From the difference (VR−VL) or (VL−VR) between the left and right wheel speeds, the turning direction is made known by distinguishing between positive and negative. When the fitting position of the height sensor is leftish or rightish with respect to the vehicle body, the information obtained by the sensor varies with the fitting position even though the slewing radius remains unchanged during turning motion to the left or right. Consequently, an offset component (corresponding to the deviated amount of the fitting position with the center axis of the vehicle extended in the traveling direction of the vehicle and coming to zero when a fitting error is disregarded with the fitting position situated on the center axis of the vehicle body) is produced. On condition that the leftish and rightish turnings are distinguishable from each other, the effect of the offset component can be removed (in case that the turning direction is unknown, it is feared that the posture variation based on the asymmetry of the fitting position of the sensor can be overestimated or underestimated depending on the turning direction).

When the sensor output caused by rolling during turning motion is decided to be dependent on the pitch variation in the form of providing only the front- or rear-wheel axle portion with the height sensor, there develops a problem of making the output of any other height sensor incomparable. However, the vehicle posture can be recognized more accurately since a rolling generating condition is calculated quantitatively by seeking centrifugal force from the left and right wheel speeds as described above.

Accuracy in the detection of the turning condition can needless to say be increased by applying the invention to not only the one sensor system but also the form of attaching height detecting means to the respective front- and rear-wheel axle portions (so-called two sensor system).

As is obvious from the description given above, according to the present invention, the correction of the optical axis of projection light can be made accurately by calculating the information involved with the left and right wheel speeds and characteristic information of the vehicle including the width and weight of the vehicle so as to apprehend the rolling condition.

Further, according to the present invention, centrifugal force can simply be calculated from the left and right wheel speeds, the difference between the wheel speeds and vehicle weight and width, so that it is not needed to directly find the slewing radius when the centrifugal force is calculated.

Further, according to the present invention, when the amount of rolling produced by the centrifugal force during turning motion is great, the control range or the control response of the projecting direction is restricted, whereby the optical axis of projection light is prevented from being corrected improperly.

Further, according to the present invention, proper control is performable by correcting the direction of the optical axis of light projected from the headlamp on only one side is made in response to the turning direction so as to distinguish between different behaviors involved with the turning direction.

What is claimed is:

1. A projecting direction control system for a vehicle headlamp comprising:
   a vehicle-posture detecting means for detecting variation in the posture in the traveling direction of a vehicle;
   a light projection control means for controlling the direction of optical axis of light projected from a vehicle headlamp in response to variation in the vehicle posture;
   a wheel-speed detecting means for detecting left and right wheel speeds, and
   a posture decision means for calculating centrifugal force from the left and right wheel speeds obtained by the wheel-speed detecting means, difference between the wheel speeds, and characteristic information of the vehicle including vehicle width and vehicle weight, so as to recognize a rolling condition,
   wherein the posture decision means calculates the centrifugal force while the vehicle is turning by obtaining the product of the left wheel speed or right wheel speed and the difference between the left and right wheel speeds and multiplying the product by the ratio of vehicle weight to vehicle width.

2. A projecting direction control system for a vehicle headlamp comprising:
   a vehicle-posture detecting means for detecting variation in the posture in the traveling direction of a vehicle;
   a light projection control means for controlling the direction of optical axis of light projected from a vehicle headlamp in response to variation in the vehicle posture;
   a wheel-speed detecting means for detecting left and right wheel speeds, and
   a posture decision means for calculating centrifugal force from the left and right wheel speeds obtained by the wheel-speed detecting means, difference between the wheel speeds, and characteristic information of the vehicle including vehicle width and vehicle weight, so as to recognize a rolling condition,
   wherein a control range or a control response of the projecting direction involved with the vehicle headlamp is restricted, when centrifugal force is decided by the posture decision means to be great.

3. A projecting direction control system for a vehicle headlamp according to claim 2, further comprising a drive means,
   wherein the drive means changes the direction of the optical axis of light projected from the headlamp, in a vertical direction, receiving a signal from the light projection control means.

4. A projecting direction control system for a vehicle headlamp according to claim 2, wherein the posture decision means decides that the centrifugal force is great, when the centrifugal force exceeds a predetermined threshold.

5. A projecting direction control system for a vehicle headlamp according to claim 2,
   wherein the optical axis of light projected from the headlamp is controlled, when the vehicle is decided to be turning by the posture decision means.

6. A projecting direction control system for a vehicle headlamp according to claim 2,
   wherein the posture decision means performs the process of deciding a turning direction from a sign indicating the difference between the left and right wheel speeds;
   when the vehicle is decided to be turning to the left, the optical axis of light projected from the left headlamp is controlled, and
   when the vehicle is decided to be turning to the right, the optical axis of light projected from the right headlamp is controlled.

7. A projecting direction control system for a vehicle headlamp according to claim 6,
   wherein the optical axis of light projected from the left headlamp is controlled not to be excessively tilted upward, when the vehicle is decided to be turning to the left,
   the optical axis of light projected from the right headlamp is controlled not to be excessively tilted upward, when the vehicle is decided to be turning to the right.

* * * * *